169 FIRE EXTINGUISHERS
14
Draftsman
O. R. ERWIN AND C. B. FLORY.
APPARATUS FOR EXTINGUISHING FIRES.
APPLICATION FILED FEB. 11, 1922.
Reissued May 16, 1922.
Re 15,355.
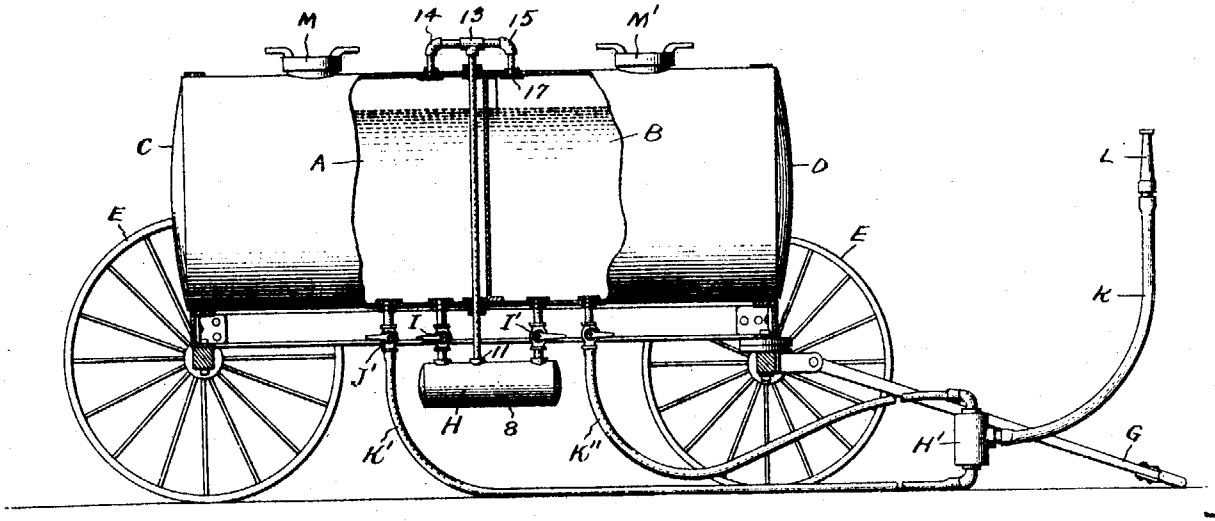
Inventors
Orlando R. Erwin
and Curtis B. Flory
By their Attorneys
Meyers, Cavanagh & Whitehead

14

Draftsma

UNITED STATES PATENT OFFICE.

ORLANDO R. ERWIN AND CURTIS B. FLORY, OF FOREST HILLS, NEW YORK, ASSIGNORS TO FOAMITE FIREFOAM COMPANY, OF NEW YORK, N. Y., A CORPORATION OF DELAWARE.

APPARATUS FOR EXTINGUISHING FIRES.

15,355. Specification of Reissued Letters Patent. Reissued May 16, 1922.

Original No. 1,331,466, dated February 17, 1920, Serial No. 150,301, filed February 23, 1917. Application for reissue filed February 11, 1922. Serial No. 535,668.

*To all whom it may concern:*

Be it known that we, ORLANDO R. ERWIN and CURTIS B. FLORY, citizens of the United States, residing at Forest Hills, county of Queens, and State of New York, have invented new and useful Improvements in Apparatus for Extinguishing Fires, of which the following is a specification.

Our invention relates to manually controlled apparatus for generating foam for extinguishing fires, and it pertains more especially to that class of fire engines in which two normally separate chemical solutions are mixed to form foam which is forcibly discharged by its own expansion, upon the fire, when required.

The present greatly increased use of gasolene, oils, greases, etc., for automobiles, gasolene engines, motor boats, etc., and the consequent greatly increased fire hazard resulting therefrom has created a demand for reliable fire fighting apparatus of greater capacity than heretofore and which employs special fire extinguishing liquids or solutions.

The principal object of this invention is to provide simple, reliable and transportable apparatus of the foam generating type, which will not only be self contained, and manually controllable, but which will have greater fire extinguishing capacity than any devices heretofore known of like character for combating fires in highly inflammable liquids, etc.

Another object is to provide apparatus which will not only be entirely slop-proof during rapid transportation over rough roads, etc., to the fire, whereby any premature mixing of the solutions employed will be avoided and a portion of such chemicals lost, but which will be at all times manually controllable as to the pressures generated, and as to the velocity and quantity of foam discharged at the nozzle.

Further objects of the invention will be apparent hereinafter from the following specification and claims.

In the drawing:

The view which is partly in side elevation and partly in section, shows one form of our invention and illustrates a tank divided into two solution-containing compartments, said tank being mounted on wheels for transportation purposes.

In the form of the invention shown in the drawing, a tank is mounted upon wheels E so that it may be transported from place to place. This tank is divided into two compartments C and D, intended to contain the normally separated solutions A and B respectively, a handle G, or the equivalent thereof, being provided to draw the extinguisher from place to place.

One of the solutions comprises water, sodium bicarbonate and a foam forming substance such as saponin, and the other solution may be composed of water and aluminum sulfate, forming what is known as an acid solution. The letter H indicates a valved mixing chamber, in the form of a relatively small cylindrical tank 8, into which the two solutions are simultaneously discharged, by gravity, through manually controlled discharge valves I and I′ operatively connecting the chamber H with the compartments C and D respectively. This chamber H forms a mixing chamber, and when the solutions from the compartments C and D enter this chamber H through the valved connections I and I′, foam and gas are generated in the mixing chamber. The mixing chamber H is provided with a port 11 to which is connected the lower end of a vertical pipe 12. The upper end of this pipe 12 is provided with a T cup 13 connected at one side with an elbow 14 in turn connected with a duct 16 leading to the compartment C and at its opposite side the T 13 is connected with an elbow 15, in turn connected to the duct 17 leading to the compartment D. This arrangement of pipe connections between the tank H and the compartments C and D serves to equalize the pressures in the mixing chamber and the compartments thereby insuring a continuous discharge of the two solutions A and B into the mixing chamber when the valves I and I′ are open. Removable covers M and M′ are provided on the top portions of the compartments C and D respectively, to facilitate the filling, washing and inspection of such compartments.

A valve connection J′ is connected to the bottom of the compartment C and a hose pipe K′ leads from the valve connection J′ to the second mixing chamber H′. A similar valve connection J″ is connected with the bottom of the chamber D and from this connection J″ the hose pipe K″ also leads to the chamber H′. Connected with the chamber H′ is a discharge hose K terminating in a suitable nozzle L. Presuming the compartments to contain the solutions A and B, the operation of the device in the case of fire, for example, is as follows:

The valves I and I′ are first opened, thus permitting a portion of the two solutions A and B to flow by gravity into the foam chamber H wherein they are mingled and foam and gas generated. The foam generated in this chamber H is forced by the pressure up through the pipe 12, the T 13, elbows 14 and 15 and ducts 16 and 17 into the chambers C and D, producing such pressure upon the solutions A and B still remaining in these compartments, that, when the valve connections J′ and J″ are opened the solutions will be forced out through these valves and through the hose lines K′ and K″ into the second mixing chamber H′ where they are thoroughly mixed, producing the fire extinguishing foam, which is forcibly ejected through the discharge hose K and the nozzle L so that the operator holding the nozzle may play the stream of foam over or upon the burning surface for the purpose of extinguishing the fire.

It will be obvious that the essence of this invention is to produce simple fire extinguishing apparatus, in which not only the use of compressed air, or other exterior means, such as pumps, for forcing together the two, separated solutions is dispensed with, but in which the two solutions are commingled and the resultant foam is forcibly discharged by the pressure of the gas generated which forms the foam, also that by the aid of throttle valves, controlling the solutions and foam, a uniform discharge at the nozzle may be obtained, or otherwise controlled as required, entirely at the will of the operator, and further, that when in rapid transportation from place to place, the apparatus may be rendered slop-proof (by closing the solution controlling valves), whereby any premature commingling of the solutions is avoided, which results in corresponding loss of efficiency when the apparatus is required at the fire.

We claim:

1. The method of extinguishing fires, consisting in mixing a portion of chemically reacting solutions in a closed receptacle to develop an ejecting pressure and utilizing said pressure to deliver the remainder of the chemically reacting solutions separately and in continuously flowing streams into mixing relation with each other, under pressure developed by the first mentioned mixture.

2. The method of extinguishing fires, consisting in mixing a portion of foam producing chemical solutions in a suitable container, utilizing the pressure of the foam so developed to eject the remainder of the foam producing solutions simultaneously from their containers into a common discharge passage in the form of continuous streams and into intermixing relation with each other.

3. Fire extinguishing apparatus including a plurality of containers adapted for the separate storage of solutions which, when mixed, produce fire extinguishing foam, a separate delivery outlet for each container adapted to be connected to a mixing station and means for applying delivery pressure to the contents of each container, including means for bringing together a portion of one solution and another substance to generate gas.

4. Fire extinguishing apparatus including a plurality of containers adapted for the separate storage of solutions which, when mixed, produce a fire extinguishing foam, a separate delivery outlet for each container adapted to be connected to a mixing station and means for applying delivery pressure to the contents of each container, including means for intermingling portions of the different solutions.

5. Fire extinguishing apparatus including the combination of a set of receptacles adapted for storing solutions which, when mixed, will develop fire extinguishing foam by chemical reaction, said receptacles having a common delivery passage, means for mixing a portion of said solutions to develop an ejecting pressure in the receptacles and means for separately delivering other portions of said solutions to the common delivery passage to be mixed therein.

6. Fire extinguishing apparatus including a combination of receptacles adapted for storing solutions which, when mixed, will develop fire extinguishing foam by chemical reaction, said receptacles having a common delivery passage, means for mixing a portion of said solutions to develop an ejecting pressure in the receptacles and means for separately delivering other portions of said solutions to the common delivery passage having an enlarged cavity adjacent to its inlet end adapted to facilitate mixing said separately delivered portions of the solutions.

7. The method of extinguishing fires, which consists in separately storing in solution tanks, component solutions which, upon comixture, produce a fire extinguishing medium, and in comixing in time of fire one of the component solutions with another solution for the generation of a gas to exert operating pressure on the solutions in the tanks to drive them through separate solution lines for subsequent comixture to produce the fire extinguishing medium.

8. The method of extinguishing fires, which consists in separately storing in solution tanks, component solutions which, upon

14

Draftsma comixture, produce a fire extinguishing foam, and in comixing in time of fire one of the component solutions with another solution for the generation of a foam to exert operating pressure on the solutions in the tanks to drive them through separate solution lines for subsequent comixture to produce the fire extinguishing foam, said second comixture taking place at a point remote from said first comixing.

9. In a fire extinguishing apparatus of the class described, the combination with a pair of compartments adapted to normally contain two separated foam producing solutions, a chamber for receiving and mixing said solutions located in receiving connection with both compartments, means for simultaneously discharging said solutions into said mixing chamber where they are mixed, connections between said mixing chamber and the compartments for conducting the resultant foam from the mixing chamber to said compartments above the solution levels in the compartments, a second mixing chamber, means connecting each of the compartments with the second mixing chamber, and a discharge pipe connected with the said second mixing chamber.

10. In a fire extinguishing apparatus of the class described, the combination with a pair of compartments adapted to normally contain two separated foam producing solutions, a mixing chamber for receiving and mixing said solutions located in receiving connection with both of said tanks, means for simultaneously discharging said solutions together into said mixing chamber, ducts connecting said mixing chamber with the space above the solutions in said compartments for conducting the resultant foam from said chamber to said compartments and above the solution levels of the latter, a second mixing chamber, a duct connecting each of said compartments with the second mixing chamber, a discharge outlet from the second mixing chamber, and valve connections for manually controlling the admission and discharge of the foam to and from the mixing chambers.

Signed at New York city, county of New York, State of New York, this 19th day of January, 1922, and 2nd day of February, 1922.

ORLANDO R. ERWIN.
CURTIS B. FLORY.